United States Patent [19]

Miller et al.

[11] Patent Number: 4,866,579
[45] Date of Patent: Sep. 12, 1989

[54] SNAP-IN MIRROR PACKAGE

[75] Inventors: Roger G. Miller; Robert J. Clark, both of Holland, Mich.

[73] Assignee: Prince Corporation, Holland, Mich.

[21] Appl. No.: 197,587

[22] Filed: May 23, 1988

[51] Int. Cl.⁴ ............................................. F21V 33/00
[52] U.S. Cl. ...................................... 362/144; 362/80; 362/140; 296/97.5; 24/615; 24/697
[58] Field of Search ................... 362/61, 80, 135, 136, 362/140, 144; 296/97.5; 403/326, 380; 24/615, 625, 697

[56] References Cited

U.S. PATENT DOCUMENTS

| 3,179,969 | 4/1965 | Glynn | 24/625 X |
|---|---|---|---|
| 4,068,930 | 1/1978 | Marcus | 350/277 |
| 4,075,468 | 2/1978 | Marcus | 362/144 |
| 4,648,011 | 3/1987 | Boote et al. | 362/135 |
| 4,653,798 | 3/1987 | White et al. | 296/97 H |
| 4,685,723 | 8/1987 | Canadas | 296/97.5 |

FOREIGN PATENT DOCUMENTS 2220711 11/1973 Fed. Rep. of Germany .

Primary Examiner—Stephen F. Husar
Attorney, Agent, or Firm—Price, Heneveld, Cooper, DeWitt & Litton

[57] ABSTRACT

A vanity mirror package for a visor includes snap-fastening connectors extending from the mirror frame toward a recess formed in the visor body. The visor body includes a floor with connectors which cooperate with the snap-fastening connectors of the mirror frame such that the vanity mirror package is self-aligning during assembly and can be inserted and removed by flexing one of the connectors without contacting the visor upholstered material or deforming the mirror frame.

20 Claims, 2 Drawing Sheets

SNAP-IN MIRROR PACKAGE

BACKGROUND OF THE INVENTION

The present invention relates to visors and particularly to visors including a vanity mirror package which can be snap fitted to the visor body.

Covered illuminated vanity mirror visors have become popular vehicle accessories either as standard equipment on many vehicles or as an option. U.S. Pat. No. 4,075,468 discloses one construction by which a vanity mirror package is fitted within a recess on a visor body utilizing threaded mounting bosses in the visor body and screws which extend through apertures in the vanity mirror package to secure the package to the visor allowing removal. The screws are subsequently covered by snap-out lenses to provide a finished appearance concealing the screws when the visor assembly is completed.

A variety of other mirror packages have been proposed which provide a packaged vanity mirror for a visor which attaches to a visor body without utilization of screws. U.S. Pat. No. 4,648,011 discloses one such system in which a panel fits within a recess of the visor body and the outer edge of the mirror frame opposite the panel includes snap-locking tabs which engage a sidewall of the recess formed in the visor for holding the package to the visor. U.S. Pat. No. 4,760,503 issued July 26, 1988 filed Sept. 26, 1986 and entitled VISOR FOR A VEHICLE discloses a now commercialized visor mirror package which includes snap locking tabs which hold the package to a recess in the visor body. Although such a snap-in mirror package does not require the utilization of screws once installed, in order to remove the same it is necessary to wedge a tool such as a flat bladed screwdriver between the upholstered finished visor body and the mirror frame and pry the frame outwardly. The pressure on the mirror frame frequently will fracture the mirror Also, frequently the visor upholstery material is damaged. Thus, although such a system does not use screws, which requires time and effort not only to remove the screws but also both lenses and subsequently the four screws holding the prior art package to the visor, the snap-in assemblies to date have been removable only at the cost of possibly damaging the surrounding mirror and upholstery material.

SUMMARY OF THE PRESENT INVENTION

The visor of the present invention, however, overcomes the deficiencies of this prior art by providing a vanity mirror package for a visor including a mirror frame which includes snap-fastening connector mean extending from the mirror frame toward a recess formed in the visor body. The visor body includes a floor with connector means which cooperate with the snap-fastening connector means of the mirror frame such that the vanity mirror package can be inserted and removed by flexing one of the connector means without contacting the visor upholstered material or deforming the mirror frame. Also, by spacing the interlocking connector means of the visor package and visor body inwardly from the peripheral edge of the recess of a visor, and preferably behind the lenses, removal of the lenses provides access for easy removal of the package. Thus, a snap-in package is provided which has the benefits of earlier snap-in devices without the problems of damaging the mirror or upholstery if removal of the package becomes necessary. Also, the connectors of the preferred embodiment provide self-alignment of the package which is easier to assemble which operation can be automated These and other features, objects and advantages of the present invention will become apparent upon reading the following description thereof together with reference to the accompanying drawings in which:

DETAILED DESCRIPTION OF THE PREFERRED EMBODIMENT

Figure 1:
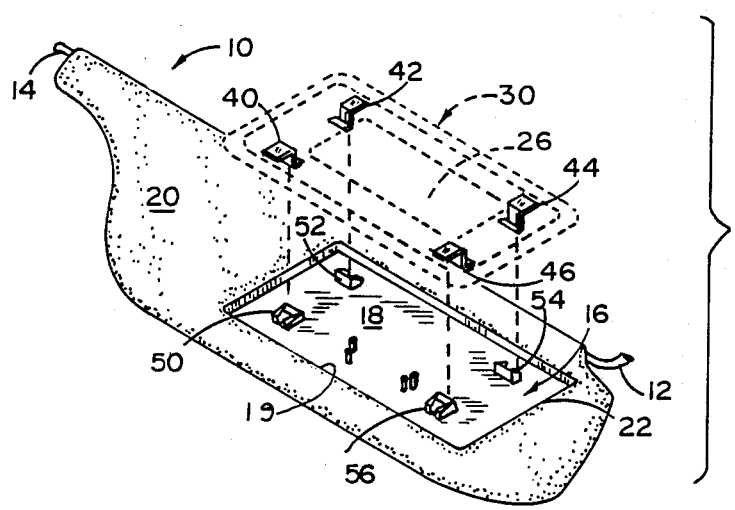
FIG. 1 is a fragmentary perspective view partly in phantom form of a visor and vanity mirror package embodying the present invention.
Figure 4:
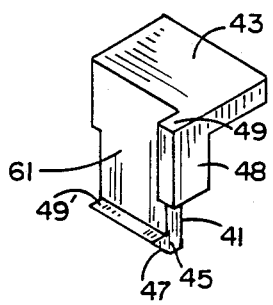
FIG. 4 is a perspective view of one of the connectors extending from the mirror package shown in FIG. 1
Figure 5:
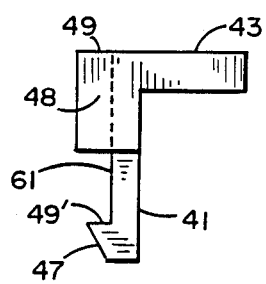
FIG. 5 is a right side elevational view of the connector shown in FIG. 4.
Figure 6:
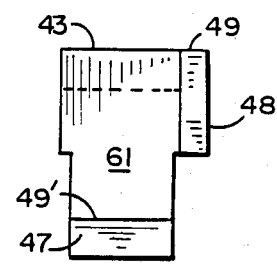
FIG. 6 is a front elevational view of the connector shown in FIG. 5.
Figure 7:
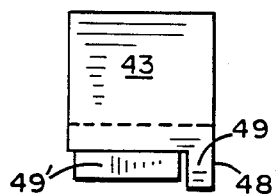
FIG. 7 is a top plan view of the connector shown in FIG. 4.
Figure 8:
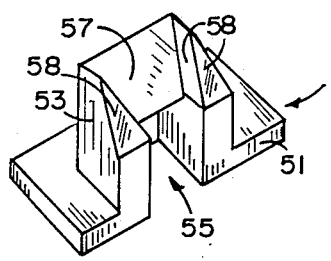
FIG. 8 is a perspective view of one of the mating connectors extending from the floor of the visor recess as shown in FIG. 1.
Figure 9:
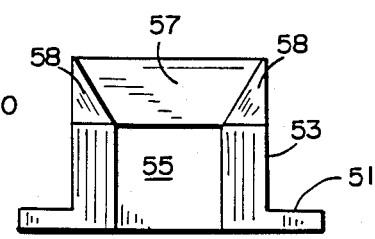
FIG. 9 is a front elevational view of the connector shown in FIG. 8.
Figure 10:
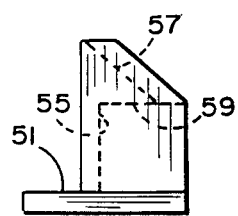
FIG. 10 is a left side view of the connector shown in FIGS. 8 and 9.
Figure 11:
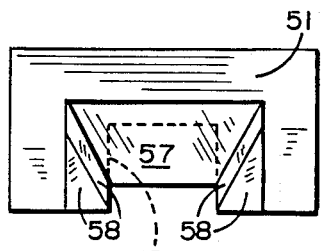
FIG. 11 is a top plan view of the connector shown in FIG. 8.

Referring initially to FIG. 1, there is shown a visor 10 for use in a vehicle such as an automobile. The visor includes a pivot arm 12 which mounts to the visor to allow it to be raised and lowered The end of angled arm 12 is attached to a suitable bracket in the vehicle for allowing the visor to pivot between front and side window positions. The opposite end of the visor 10 may include a stub axle 14 for removably supporting this end of the visor in a conventional bracket mounted to the vehicle. The visor includes a molded polymeric body defining in part a recess 16 having a floor 18 and edge walls 19 defining the generally rectangular recess 16. Floor 18 extends in a plane parallel to the plane of the visor body. An upholstery material 20 covers the visor core and surrounds the peripheral edge 22 of recess 16 and can be secured thereto by an ultrasonic welding process or other suitable means.

Extending upwardly from the floor 18 in the recess 16 are four spaced connectors 50, 52, 54, and 56 which are each of identical construction and which can be either integrally molded with the visor core and floor 18 or separately fused to the floor utilizing a conventional fusion method either by heat fusion, or by utilizing a suitable bonding adhesive. Preferably, however, the connectors 50, 52, 54, and 56 defining tab receiving sockets are integrally molded to the visor core and extended upwardly from the floor 18 in inwardly spaced relationship to the sidewalls 19 of recess 16. One of the socket defining connectors 50 is shown in detail in FIGS. 8-11 describe in greater detail below.

Figure 2:
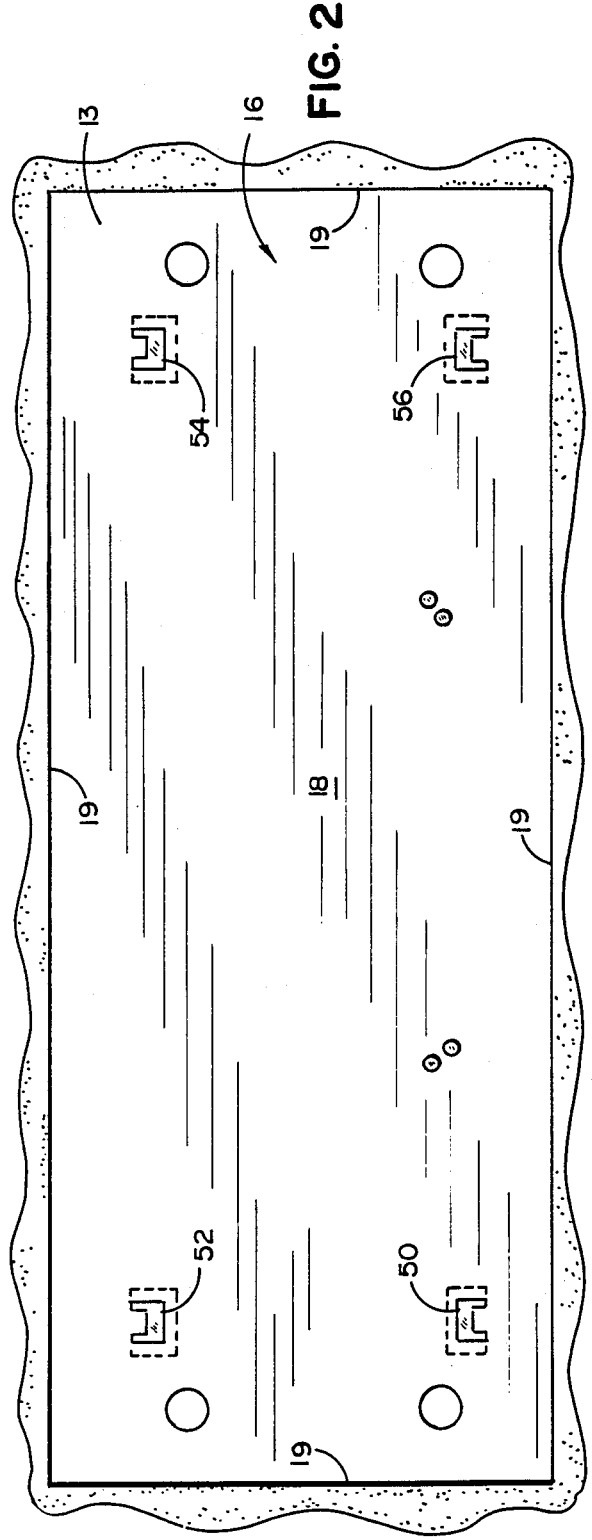
FIG. 2 is an enlarged fragmentary front elevational view of the visor body showing the recess and interconnecting means.
Figure 3:
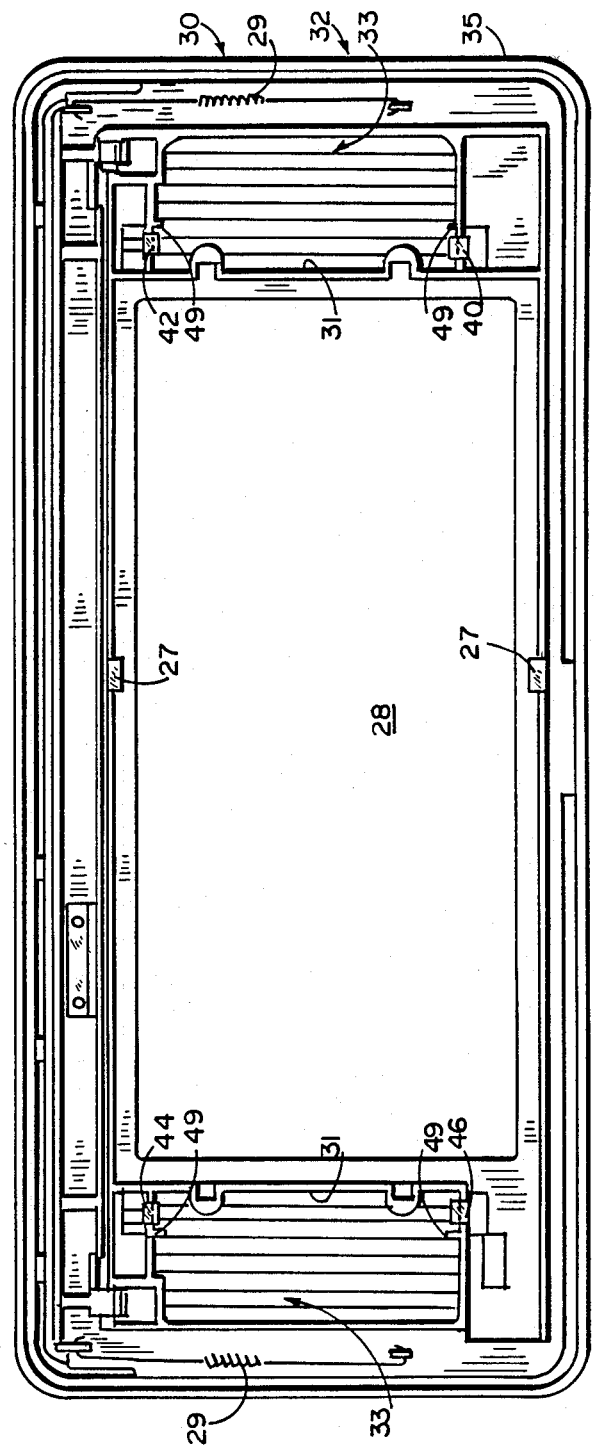
FIG. 3 is an enlarged rear elevational view of the mirror package shown in FIG. 1.

Removably fitted within the recess 16 is an illuminated vanity mirror package 30, which includes a cover 26 for selectively covering a mirror 28 (FIG. 3) and illumination means in the mirror frame 32. The illuminated vanity mirror package 30 with the exception of its mounting to the visor body, can be substantially of the same construction in terms of mounting of the cover to the mirror frame as well as the lenses and illumination means as described in U.S. Pat. No. 4,491,899 assigned to the present assignee, the disclosure of which is incorporated herein by reference Connectors 40, 42, 44, and 46 are integrally molded to the mirror frame as best seen in FIG. 3 and extend downwardly toward the floor 18 of the recess as seen in FIG. 1 for snap fitting the package 30 within recess 16. The snap fitting interconnecting means is now described in greater detail with reference initially to FIGS. 2 and 3.

Referring initially to FIG. 3, there is shown the assembly 30 which is snap-fitted within recess 16 of the visor body and which includes the generally rectangular mirror frame 32 for pivotally receiving cover 26 with the top rear edge of the cover being shown in the Figure. A pair of springs 29 extend between the cover and frame 32 for selectively holding the cover in open or closed positions as described in the above-identified U.S. Pat. No. 4,491,899. The frame includes a rectangular opening for receiving the mirror 28 which is held therein by means of spaced tabs 27. Frame 32 also includes a pair of generally rectangular apertures 31 on opposite sides of the rectangular mirror receiving aperture for receiving lenses 33 that snap-fit therein The connectors 40, 42, 44, and 46 define resilient tabs which are integrally molded to mirror frame 32 immediately adjacent apertures 31 along the top and bottom edges thereof. The outer peripheral edge 35 of the mirror frame overlies the peripheral edge 22 of the recess 16 to provide a trim appearance to the visor once package 30 has been installed. When the snap-fitted lenses 33 are removed from frame 32, connectors 40, 42, 44, and 46 are exposed to allow the package 30 to be removed as described below.

The molded polymeric visor body 13 (FIG. 2) can be formed of an integrally molded clamshell-type construction in which a pair of core halves are hinged along a common edge and snap-fit or otherwise connected to one another as described for example in U.S. patent application Ser. No. 058,996 entitled VISOR filed on June 8, 1987 and now allowed. One of the sides of the integral clamshell core members defines the floor 18 which together with sidewalls 19 define the rectangular recess 16. Spaced inwardly from the four corners of the rectangular recess 16 are the connectors 50, 52, 54, and 56 which lockably but removably receive the resilient tabs 40, 42, 44, and 46, respectively, which are located in position in alignment with the mating connectors. Like the resilient tabs 40, 42, 44, and 46, the integral connectors 50, 52, 54, and 56 defining sockets are also integrally molded to the visor body or core 13 which can be made of a polypropylene material. Typically, the frame and integral connectors would be made of a suitable polymeric material such as polycarbonate. One of the mating connecting means 40 and 50 is shown in detail in FIGS. 4-12, it being understood that each of the connector means of the four which are spaced inwardly from the four corners of the recess 16 and inwardly from the frame 32 of package 30 are substantially identical. Although the connecting means can be integrally formed on the mirror frame and/or visor core as illustrated in FIG. 1, for purposes of describing the geometric configuration of these members, they are shown in FIGS. 4-11 as separate pieces.

Turning now to FIGS. 4-7, one of the connectors 40 is shown in detail. The connector defines a resilient tab with a downwardly depending leg 41 extending from the base 43 which may be integral with the mirror frame 32 or fused thereto as discussed above. The lower end of leg 41 includes an inwardly projecting integral tab 45 having an inclined leading edge 47 for camming the resilient leg 41 in a direction indicated by arrow A of FIG. 12 during the snap fitting of the tab 45 into a mating notch on the corresponding connector 50 mounted to the floor of the visor recess 16. Leg 41 also includes an outwardly projecting generally rectangular ledge 48 having an edge 49 which extends into the lens receiving recess 31 as best seen in FIG. 3 for providing support for the lens 33 mounted therein. Connector 40 interlocks with connector 50 as shown in detail in FIGS. 8-11 now described.

Figure 12:
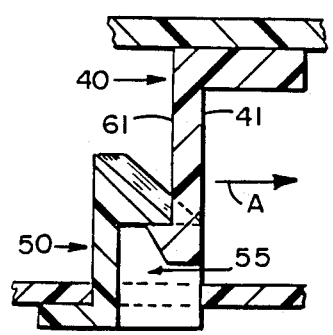
FIG. 12 is a fragmentary enlarged cross-sectional view through the interlocking connector means when the visor and mirror package are assembled by pressing the package downwardly into the recess of the visor body.

Connector 50 is identical to the remaining connectors mounted to the visor recess and includes a base 51 which can be integral with the floor 18 of visor core 13 or separately attached by bonding. Extending upwardly from base 51 is a shoulder 53 having a generally U-shaped notch 55 form therein with a lead-in slot defined by tapered rear wall 57 and inwardly tapered pairs of faceted sidewalls 58 on either side for guidably receiving the tab 45 of connector 40. The lower edge of the rear wall 57 is step cut inwardly to define a horizontally extending ledge 59 which interlocks with the corresponding ledge 49' of tab 45 as best seen in FIG. 12. The shape of the tapered notch or slot 55 with the inclined walls 57 and 58 provides guided support for the rectangular tab 45 as the mirror package 30 is positioned in general alignment with recess 16 of the visor 10 and allows the tabs to nest in the upper area of the connector 50 above ledge 59 prior to the final interlocking of tab 45 with interlocking shelf 59. This is accomplished once the mirror package is generally positioned in alignment with the connector tab resting on the tapered surfaces 57 and 58 of the connectors and subsequently pushing the mirror package downwardly to deflect arms 41 allowing them to clear over the tip of inclined wall 57 and interlock with the undercut shelf 59 as best see in FIG. 12. Once edge 47 clears the junction of wall 57 and shelf 59, tab 41 will spring backwardly into an interlocking position shown in FIG. 12. Naturally, the width of notch 55 is sufficient to receive the tab 45 and the wider tapered opening at the entry of the tab allows the package 30 to be indexed and is self-centering when it is nested over recess 16 during installation and prior to the final locking in place. This allows relatively high speed automated assembly since no critical pre-alignment is required with the self-aligning connectors.

In the preferred embodiment of the invention, by positioning the resilient tabs adjacent the lens openings, the mirror package can be easily removed by placing a flat bladed instrument against surface 61 (FIG. 12) of leg 41 and pushing it in the direction indicated by arrow A such that it unlocks from the connector 50. The connectors on the same side of the mirror package are similarly unlocked so that, for example, the upper edge of the mirror package can be freed allowing the lower edge to be released as well. By facing the projecting lips 49' of the connectors inwardly and adjacent lens apertures 31, access to surface 61 is available for relatively easy removal of the mirror package without damage to the upholstery or breakage of the mirror. It will become apparent to those skilled in the art that it would be possible likewise to reverse the connectors by placing the tabs within the visor recess 16 and the tab receiving socket-like connectors 50, 52, 54, and 56 on the mirror frame. Also, the connectors can be used for attachment of other vehicle accessories. These and other modifications to the preferred embodiment will fall within the spirit and scope of the present invention as defined by the appended claims.

The embodiments of the invention in which an exclusive property or privilege is claimed are defined as follows:

1. An accessory attachment structure for removably attaching an accessory to a supporting body comprising:
   first connector means positioned on one of said accessory or said body and including a resilient leg having a locking tab with an inclined leading edge at a projecting end, said leg extending toward the other of said accessory or said body; and
   second connector means positioned on the other of said accessory or said body and defining socket means including a tapered entry slot for aligning and receiving said tab, and means communicating with said slot for lockably receiving said tab such that when said accessory is pressed against said body said first and second connectors are interlocked; wherein said socket means of said second connector means includes a generally U-shaped notch and said entry slot includes tapered sidewalls and a tapered rear wall extending at least partially along said U-shaped notch.

2. The apparatus as defined in claim 1 wherein said attachment structure comprises a plurality of first and second connector means which are positioned to align with one another.

3. The apparatus as defined in claim 1 wherein said first connector means is made of a resilient polymeric material.

4. An accessory attachment structure for removably attaching an accessory to a supporting body comprising:
   first connector means made of a resilient polymeric material and positioned on one of said accessory or said body and including a resilient leg having a locking tab with an inclined leading edge at a projecting end, said leg extending toward the other of said accessory or said body; and
   second connector means positioned on the other of said accessory or said body and defining socket means including a tapered entry slot for aligning and receiving said tab, and means communicating with said slot for lockably receiving said tab such that when said accessory is pressed against said body said first and second connectors are interlocked; wherein said socket means of said second connector means includes a generally U-shaped notch and said entry slot includes tapered sidewalls and a tapered rear wall extending at least partially along said U-shaped notch.

5. The apparatus as defined in claim 4 wherein said socket means further includes a ledge which receives said tab.

6. The apparatus as defined in claim 5 wherein said first connector means is mounted to said accessory and said second connector means is mounted to said body.

7. The apparatus as defined in claim 6 wherein said accessory is a vanity mirror package for a vehicle.

8. The apparatus as defined in claim 7 wherein sai package includes illumination means including a frame having aperture means for receiving a removable lens therein.

9. The apparatus as defined in claim 8 wherein said first connector means is mounted to said frame to extend adjacent said aperture means to provide access thereto when said lens is removed.

10. The apparatus as defined in claim 9 wherein said body comprises a vehicle visor.

11. A visor assembly for a vehicle comprising:
    a visor body including a recess therein for receiving a vanity mirror package, said recess including a floor extending generally parallel to the plane of said visor body;
    a vanity mirror package shaped to fit within said recess;
    first connector means positioned on one of said accessory or said body and including a resilient leg having a locking tab with an inclined leading edge at a projecting end, said leg extending toward the other of said package or said body; and
    second connector means position on the other of said accessory or said body and defining socket means including an entry slot tapered on surfaces which circumscribe at least two adjacent sides of said tab for aligning and receiving said tab, and means for lockably receiving said tab such that when said accessory is pressed against said body said first and second connectors are interlocked.

12. The apparatus as defined in claim 11 wherein said first connector means is made of a resilient polymeric material.

13. A visor assembly for a vehicle comprising:
    a visor body including a recess therein for receiving a vanity mirror package, said recess including a floor extending generally parallel to the plane of said visor body;
    a vanity mirror package shaped to fit within said recess;
    first connector means made of a resilient polymeric material and positioned on one of said accessory or said body and including a resilient leg having a locking tab with an inclined leading edge at a projecting end, said leg extending toward the other of said package of said body; and
    second connector means positioned on the other of said accessory or said body and defining socket means including a tapered entry slot for aligning and receiving said tab and means for lockably receiving said tab such that when said accessory is pressed against said body said first and second connectors are interlocked; and wherein said socket means of said second connector means includes a generally U-shaped notch and said entry slot includes tapered sidewalls and a tapered rear wall extending partially along said U-shaped notch.

14. The apparatus as defined in claim 13 wherein said socket means further includes a ledge which receives said tab.

15. The apparatus as defined in claim 14 wherein said first connector means is mounted to said package and said second connector means is mounted to said floor of said visor body.

16. The apparatus as defined in claim 15 wherein said package includes illumination means including a frame having aperture means for receiving a removable lens therein.

17. The apparatus as defined in claim 16 wherein said first connector means is mounted to said frame to extend adjacent said aperture means to provide access thereto when said lens is removed.

18. The apparatus as defined in claim 17 wherein said visor floor includes a plurality of second connector means which are positioned to align with a plurality of first connector means mounted to said frame.

19. A visor assembly for a vehicle comprising:
   a visor body including a recess therein for receiving a vanity mirror package, said recess including a floor extending generally parallel to the plane of said visor body;
   a vanity mirror package shaped to fit within said recess;
   a plurality of first connector means extending from said package and including a resilient leg having a locking tab with an inclined leading edge at a projecting end, said leg extending toward said visor body; and
   a plurality of second connector means extending from said floor of said body and aligned with said first connector means, said second connector means each defining socket means including an entry slot tapered on at least two adjacent sides for aligning and receiving said tabs and means for lockably receiving said tab such that when said package is rested on said second connector means said tabs align with said socket means and when said package is pressed against said body said first and second connectors are interlocked.

20. The apparatus as defined in claim 19 wherein said package includes illumination means including a frame having aperture means for receiving a removable lens therein and wherein said resilient legs extend adjacent said aperture means.

* * * * *

UNITED STATES PATENT AND TRADEMARK OFFICE
CERTIFICATE OF CORRECTION

PATENT NO. : 4,866,579

DATED : September 12, 1989

INVENTOR(S) : Roger G. Miller, et al.

It is certified that error appears in the above-identified patent and that said Letters Patent is hereby corrected as shown below:

Column 2, Line 46
    After "lowered" insert --.--

Column 3, Line 35
    After "therein" insert --.--

Column 4, Line 49
    "see" should be --seen--

Column 6, Claim 8, Line 6
    "sai" should be --said--

Column 6, Claim 11, Line 29
    "position" should be --positioned--

Signed and Sealed this

Tenth Day of March, 1992

Attest:

HARRY F. MANBECK, JR.

*Attesting Officer*      *Commissioner of Patents and Trademarks*